(12) United States Patent
Ai et al.

(10) Patent No.: US 6,285,508 B1
(45) Date of Patent: Sep. 4, 2001

(54) BEAM SPLITTING BALL LENS METHOD FOR ITS MANUFACTURE AND APPARATUS FOR ITS PACKAGING

(75) Inventors: Jun Ai, Ontario (CA); Jan Popelek, Princeton; Yao Li, Monmouth Junction, both of NJ (US); Ray T. Chen, Austin, TX (US)

(73) Assignees: Radiant Research Inc., Austin, TX (US); NEC Research Institute, Inc., Princeton, NJ (US)

( * ) Notice: Subject to any disclaimer, the term of this patent is extended or adjusted under 35 U.S.C. 154(b) by 0 days.

(21) Appl. No.: 09/343,772

(22) Filed: Jun. 30, 1999

(51) Int. Cl.$^7$ ................................ G02B 3/00; G02B 7/02
(52) U.S. Cl. ............................................. 359/664; 359/819
(58) Field of Search ...................................... 359/664, 819

(56) References Cited

U.S. PATENT DOCUMENTS 4,290,667 * 9/1981 Chown .
5,323,268 * 6/1994 Kikuchi ................................. 359/664

* cited by examiner

*Primary Examiner*—Scott J. Sugarman
(74) *Attorney, Agent, or Firm*—Scully, Scott, Murphy & Presser

(57) ABSTRACT

Accordingly, a beam-splitting ball lens is provided. The beam-splitting ball lens has: a ball lens; and a beam-splitter filter disposed within the ball lens. The ball lens preferably has first and second portions wherein the beam-splitter filter is disposed at a junction between the first and second portions. The beam-splitting ball lens can further have a mid-plane optical element disposed at the junction such as, a wavelength selective filter, a polarization component, an amplitude modulation mask, a phase modulation mask, a hologram and/or a grating. Also provided is a method for fabricating the beam-splitting ball lens of the present invention. The method includes the steps of: providing the ball lens; and disposing the beam-splitter filter within the ball lens. Preferably the disposing step includes: dividing the ball lens into first and second portions; and disposing the beam-splitter filter at the junction between the first and second portions. Also provided is a mount for the beam-splitting ball lens of the present invention. The mount has a body, the body having screws to retain the beam-splitting ball lens therein. The body further having access holes for two inputs and two outputs corresponding to the two inputs. The access holes being aligned with the beam-splitter filter such that light inputted to the inputs are directed to corresponding outputs.

20 Claims, 10 Drawing Sheets

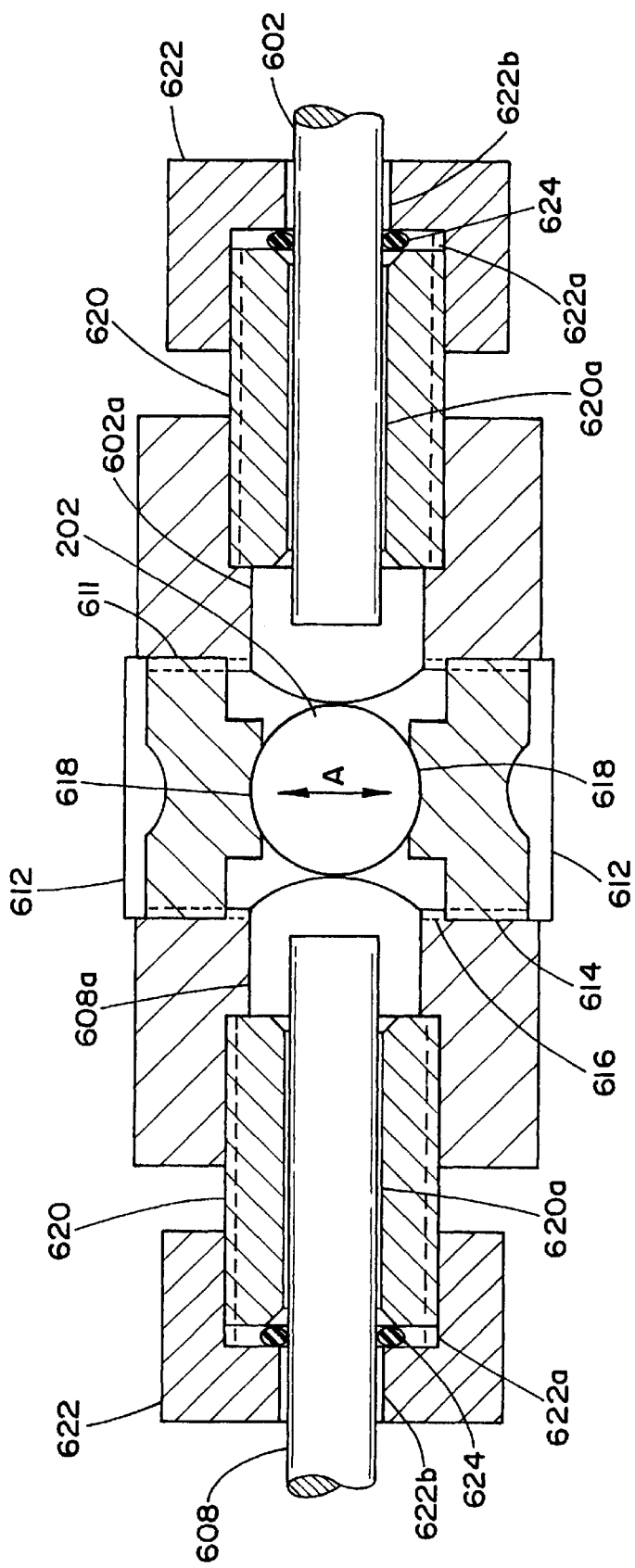

BEAM SPLITTING BALL LENS METHOD FOR ITS MANUFACTURE AND APPARATUS FOR ITS PACKAGING

BACKGROUND OF THE INVENTION

1. Field of the Invention

The present invention relates generally to beam splitting devices and, more particularly, to a beam splitting ball lens, a method for its manufacture, and an apparatus for its packaging.

2. Prior Art

Recent advances of technologies have lead to successful deployments of optics to cost-sensitive local area networking environments. To meet rapidly increasing bandwidth requirements for future multimedia computing and communications, planning for 10 Gb/s Ethernet is already underway. As technologies become gradually matured, optics will be used for even shorter data links, from inter-computer distances to intra-computer distances. Innovative, compact, and cost-effective packaging methods of optical components are actively being researched.

FIG. 1(a) illustrates a conventional beam splitter 106 and method to perform image relay and split. The beam-splitter 106 is shown surrounded by two pairs of imaging lenses 102, 104. Out of the four possible ports 108, 110, 112, 114 are two-input 108, 114 and two-output 110, 112 ports where input and split/combined output images are located. Such a system has been used to facilitate optical branching functions for parallel array of FIG. 1(a) is bulky, not to mention potential alignment and packaging complexities resulting therefrom. Thus, conventional beam-splitters 106 do not lend themselves to packaging methods of optical components that will be needed for future multimedia computing and communications.

SUMMARY OF THE INVENTION

Therefore it is an object of the present invention to provide a beam-splitting ball lens which is more compact than conventional beam-splitters.

It is a further object of the present invention to provide a beam-splitting ball lens which is more easily aligned with other optical components than conventional beam-splitters.

It is still yet a further object of the present invention to provide a beam-splitting ball lens which is packaged more easily than conventional beam-splitters.

Accordingly, a beam-splitting ball lens is provided. The beam-splitting ball lens comprises: a ball lens; and a beam-splitter filter disposed within the ball lens. The ball lens preferably comprises first and second portions wherein the beam-splitter filter is disposed at a junction between the first and second portions. The beam-splitting ball lens can further comprise a mid-plane optical element disposed at the junction, such as, a wavelength selective filter, a polarization component, an amplitude modulation mask, a phase modulation mask, a hologram and/or a grating.

Also provided is a method for fabricating the beam-splitting ball lens of the present invention. The method comprises the steps of: providing a ball lens; and disposing a beam-splitter filter within the ball lens. Preferably the disposing step comprises: dividing the ball lens into first and second portions; and disposing the beam-splitter filter at a junction between the first and second portions.

Also provided is a mount for the beam-splitting ball lens of the present invention. The mount comprises a body, the body having a means to retain the beam-splitting ball lens therein. The body further having access holes for two inputs and two outputs corresponding to the two inputs. The access holes being aligned with the beam-splitter filter such that light inputted to the inputs are directed to corresponding outputs.

Also provided is an add/drop multiplexer for downloading information of a predetermined wavelength from a plurality of wavelengths. The add/drop multiplexer comprises: a ball lens; a wavelength filter disposed within the ball lens for transmitting the predetermined wavelength, and reflecting the plurality of wavelengths except for the predetermined wavelength; an input port for transmitting the plurality of wavelengths to the ball lens; an output port for transmitting the plurality of wavelengths from the ball lens; a drop port for transmitting the transmitted predetermined wavelength from the ball lens; and an add port for adding the predetermined wavelength to the reflected wavelengths. Wherein the input, output, drop, and add ports are arranged about the ball lens such that the reflected wavelengths are transmitted to the output port, the transmitted wavelength is transmitted to the drop port, and the added predetermined wavelength is transmitted to the output port

BRIEF DESCRIPTION OF THE DRAWINGS

These and other features, aspects, and advantages of the apparatus and methods of the present invention will become better understood with regard to the following description, appended claims, and accompanying drawings where:

FIG. 6(b) is a sectional view illustrating the mount of FIG. 6(a) taken about line 6b—6b.

DETAILED DESCRIPTION OF THE PREFERRED EMBODIMENT

The present invention introduces a new integrated optical component, a beam-splitting ball lens, which integrates the functionality of five discrete optical components, namely four imaging lenses and a beam-splitter, into a single compact component. The integrated beam-splitting ball lens is a useful functional component for parallel channel optical circuitry to handle future short-distance optical interconnection needs.

Figure 1A:
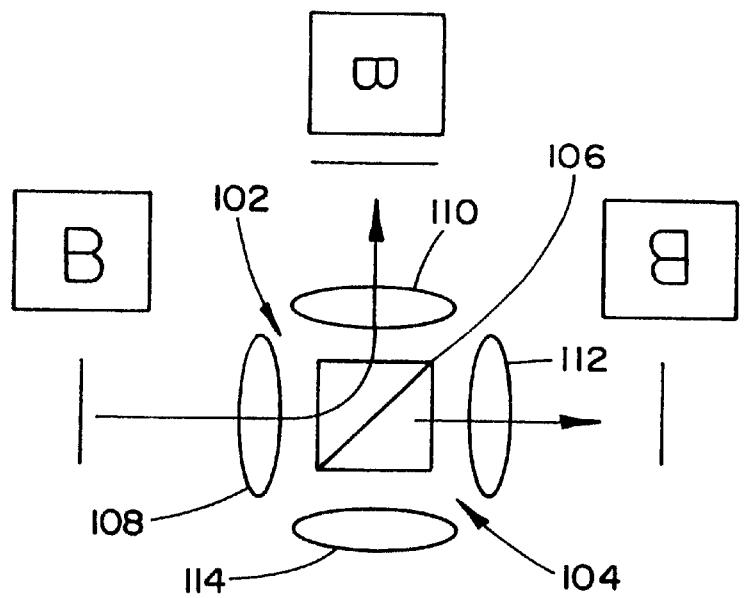
FIG. 1(a) illustrates an image relay/split unit using four lenses and a conventional beam-splitter.
Figure 1B:
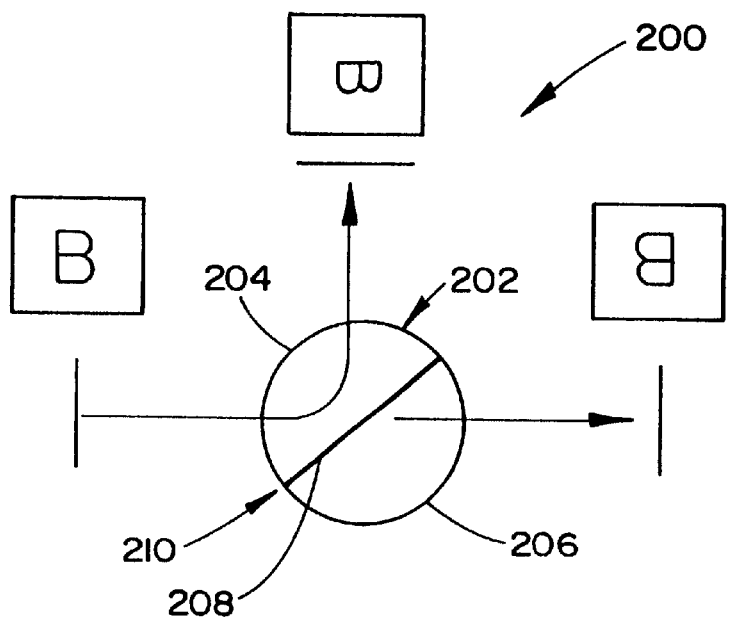
FIG. 1(b) illustrates a beam-splitting ball lens of the present invention delivering the same functionality as the image relay/split unit of FIG. 1(a).

Referring now to FIG. 1(b) there is illustrated a beam-splitting ball system 200 having a beam-splitting ball lens 202 which replaces the functionality of the setup shown in FIG. 1(a). The beam-splitting ball lens 202 can be formed by cutting a conventional ball lens into two portions, preferably halves 204, 206, forming a beam-splitter filter 208 at a mid-plane junction 210 between the halves 204, 206. However, the beam-splitting ball lens 202 may also be integrally formed with the beam-splitter filter 208, such as by insert injection molding of the ball lens with the beam-splitter filter 208 inserted in the mold. The beam-splitter filter 208 may be a membrane or coating or other types of beam-splitters known in the art. The ball lens may be glass, crystal, semiconductor, or a polymer. The halves 204, 206 are preferably the same size and shape such that the mid-plane junction 210 in which the beam-splitter filter 208 is formed or disposed in the middle of the ball lens. However, the beam-splitter filter 208 could be offset from the middle of the ball lens without departing from the scope or spirit of the present invention. Preferably, the two halves 204, 206 with the beam-splitter filter 208 are cemented or adhered together back into a ball shape with a suitable optical epoxy. However, the components do not have to be adhered to one another, they can also be retained in a ball shape by other means, such as the packaging mount discussed below.

The division of the ball lens does not have to be by time-consuming cutting or polishing, but may be done by directly forming half balls using a polymer injection molding process or a casting process. The ball lens halves may also be formed by conventional grinding. Once the beam-splitting ball lens 202 is formed, it can be used in the FIG. 1(a) geometry to deliver 2×2 image splitting/combining operations. In addition, the beam-splitting ball lens 202 has a larger angular usage range than the setup of FIG. 1(a) which is limited by the placements of the four discrete lenses. Although the beam splitting ball lens 202 is shown with the beam-splitter filter 208 oriented 45° relative to the path of input light, its orientation can be at any angle. Alternatively, the beam-splitting ball lens 202 can also include a midplane optical element (see FIGS. 5a and 5b) in addition to the beam-splitter filter 208. Examples of mid-plane optical elements include a wavelength filter, a polarization filter, or an amplitude/phase mask or grating, to name but a few. Thus, a new range of functionalities can be incorporated while the basic and essential imaging function is performed.

Figure 2:
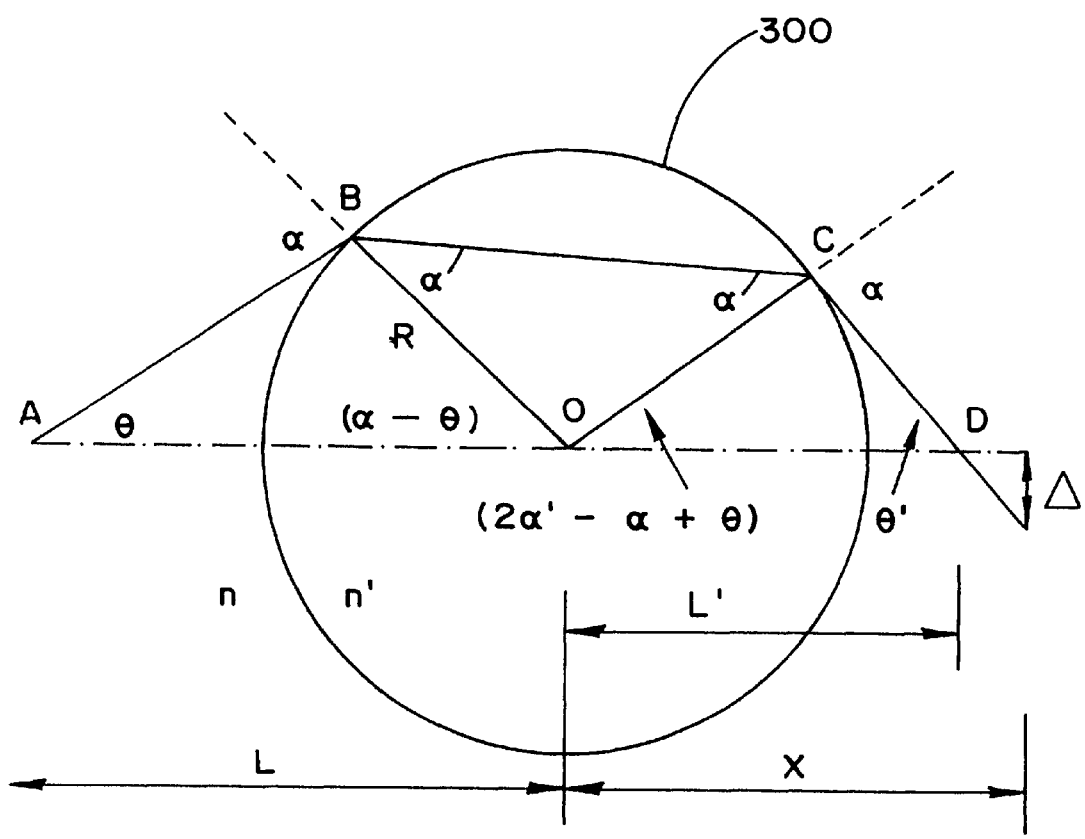
FIG. 2 illustrates a ray tracing geometry of a conventional ball lens.

For imaging, the beam-splitting ball lens 202 has the same feature as a single ball lens of identical size and material except that it offers two output imaging planes. FIG. 2 shows a general ray tracing geometry of a ball lens 300 of radius R and refractive index of n'. For an on-axis ray originated at point A towards point D, the ray enters and exits the ball at B and C before crossing the optic axis at D. For a given input distance L, A lateral error Δ occurs when the output distance is selected at X. An optimum Δ to meet a particular resolution requirement can be computed for the ball lens 300. First, from the triangle ABO and using the sine-law, we have $$\sin(\alpha) = L/R \sin(\sigma) \quad (1)$$

Using Snell's law at the boundary point B and Eq. (1), we have $$\sin(\alpha') = nL/n'R \sin(\alpha) \quad (2)$$

From trigonometry and basic properties of a ball, it can be shown that $$\sigma' = 2\alpha - 2\alpha' - \sigma \quad (3)$$

Now, the application of the sine-law to triangle OCD yields $$L' = R \sine(\alpha)/\sine(\alpha') = L \sine(\theta)/\sine(\theta') \quad (4)$$

Since the lateral error Δ is defined as $$\Delta = (X - L') \tan(\sigma') \quad (5)$$

by substituting Eq. (4) into Eq. (5), we have $$\Delta_{X,\theta} = X [\sin(\theta') - \sin(\theta)]/\cos(\theta') \quad (6)$$

Figure 3A:
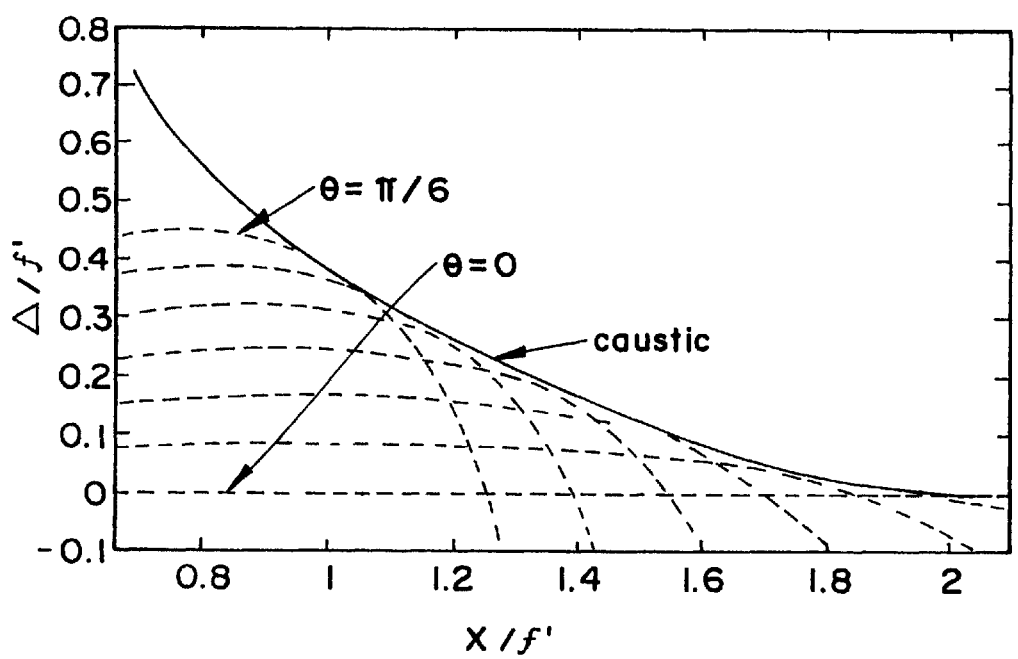
FIG. 3(a) is a graph illustrating a normalized lateral image error $\Delta/f$ vs. normalized output distance $X/f$ for the beam-splitting ball lens of the present invention wherein dotted lines illustrate different input angles a and the solid line illustrates a caustic function indicating an optimum $\Delta/f$.
Figure 3B:
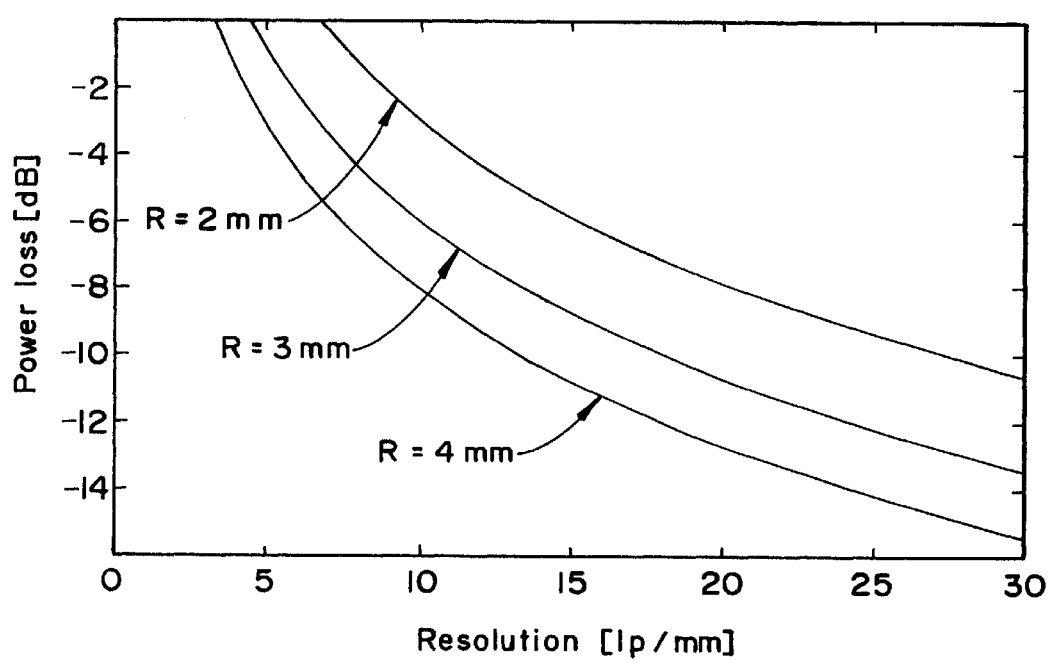
FIG. 3(b) is a graph illustrating trade-off relations between excess power loss (in dB) and the obtainable resolution (in lp/nm) with given input NA.

Using Eq. (1) through (3) and Eq. (6), a complicated expression linking θ and Δ can be derived. For unity image magnification which is the primary application of the present invention, θ is maximized for a given Δ while setting $$X = L = 2f \quad (7)$$

where f is the focal length of the ball lens, using an ideal lens equation derived from paraxial approximations. Since the optimization process does not have an analytic solution, we plot, using dotted or dashed curves, the relations between Δ/f vs. X/f with θ as a changing parameter in FIG. 3(a). The dotted straight line at the bottom corresponds to θ=0, or paraxial approximation. It can be seen that for a non-zero aperture angle σ, a non-zero lateral error Δ is inevitably generated. The envelope function as a solid curve at the top is the caustic function for the optimum relation between Δ/f and X/f. The conclusion is that the smaller the input angle to the ball lens 300, the better the resolution. However, it is also true that the smaller the input angle or limiting aperture, the larger the power loss of the system. FIG. 3(b) shows some relations between the forced power loss in unit of dB vs. the output resolution in unit of lp/mm with the launching angle as a parameter.

Figure 4:
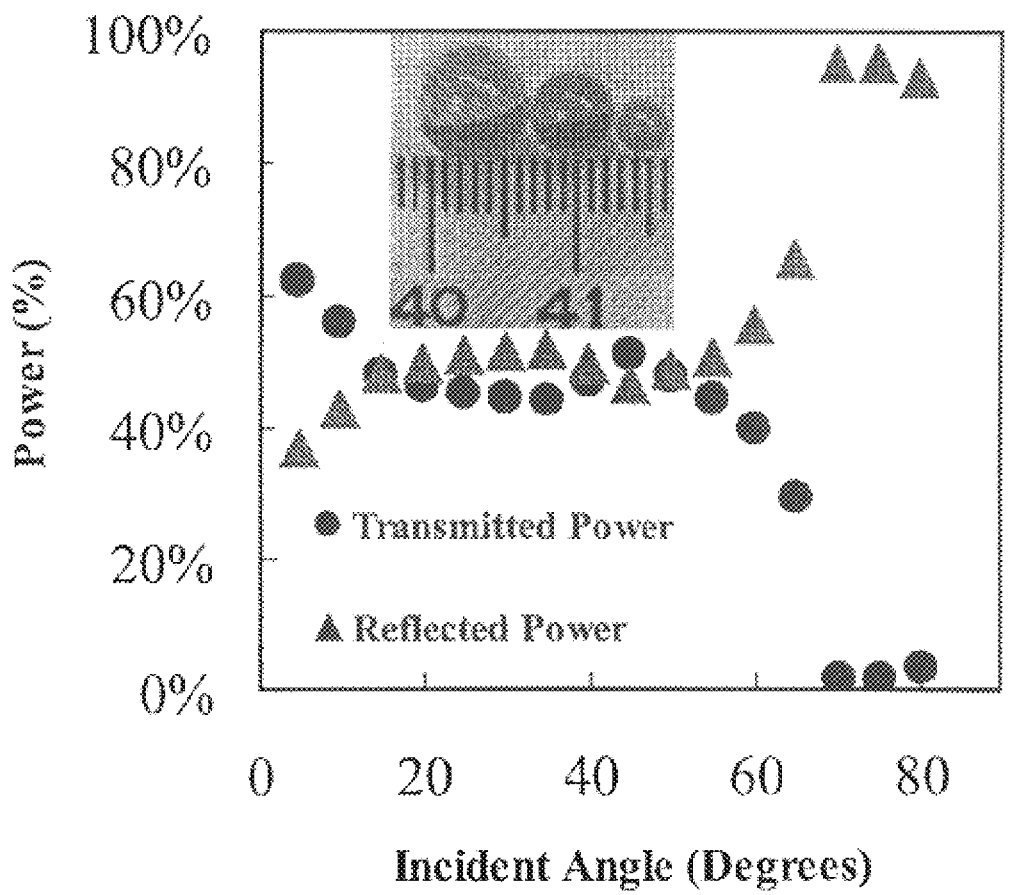
FIG. 4 is a graph illustrating typical power splitting data of transmitted and reflective beams vs. incident beam angle for a $\lambda$=650 mm beam splitting ball lens.

Based on BK7 ball lenses of different diameters, several beam-splitting ball lenses 202 were fabricated by polishing, coating and re-cementing. The beam-splitter filter 208 was a coating designed to have a 50/50 power splitting ratio for λ=650 nm at a 45° incident angle. As noted before, for large volume productions, molding of the ball lens halves is preferred because the fabrication procedure of the beam splitting ball lens 202 can be simplified. The beam-splitting ball lenses 202 fabricated had diameters ranging from 2.5 mm to 6 mm. These beam-splitting ball lenses 202 were tested using a specially designed test system which measures both the power splitting ratios at different angles and image resolution using an U.S. Air Force (USAF) resolution target, a CCD camera for image acquisition, and a PC for data analysis. For applications to optical interconnections, the target field was confined to within a circular area with a radius of 2 mm which is a standard diameter for a 3,500 pixel polymer fiber-image-guide. For a unity magnification case, all tested beam-splitting ball lenses 202 can resolve>30 lp/mm with no apparent geometric distortion when their input apertures were set to be R/2. It was noticed that this resolution is much greater than that the PFIG can supply (around 20/lp). For power measurement, it was noticed that most beam-splitting ball lenses 202 can deliver a splitting ratio with a variation of about ±6% from the designed 50/50 splitting ratio. FIG. 4 shows measured power splitting ratio of the two beams vs. incident angle. There was a 1.5 dB forced or excess power loss of the system.

Figure 5A:
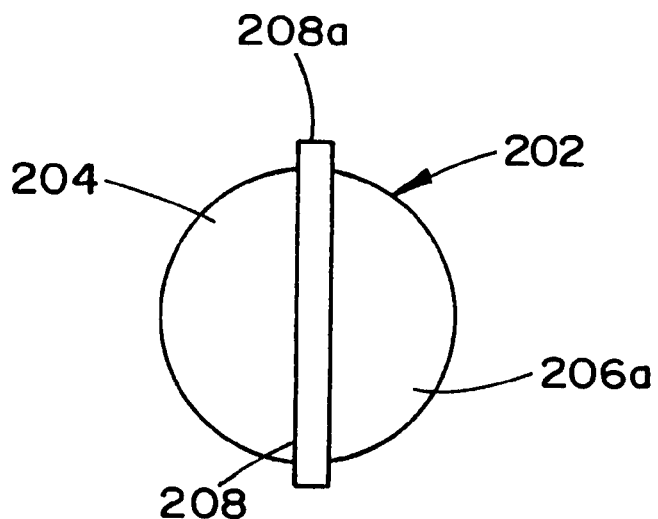
FIGS. 5(a) and 5(b) illustrate two alternative versions of the beam-splitting ball lens of the present invention wherein one of the halves of the ball lens is shaped to accommodate a mid-plane optical element.
Figure 5B:
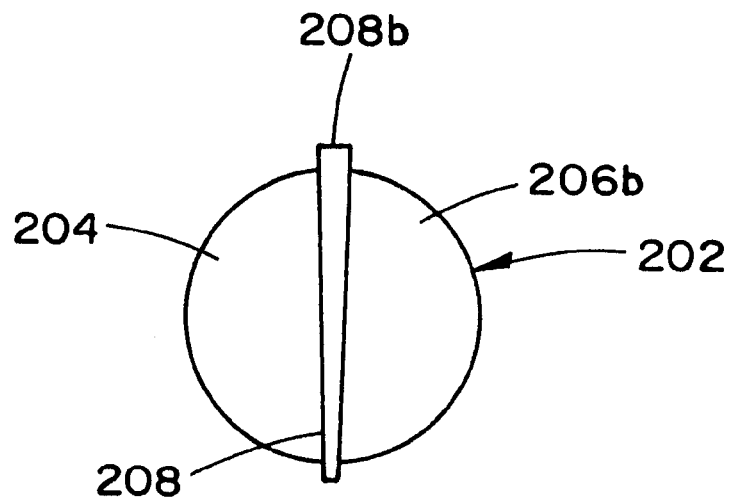

Referring now to FIGS. 5(a) and 5(b) there are shown alternative versions of the beam-splitting lens of the present invention wherein one of the halves 204 is substantially half the size of the ball lens and the other half 206a, 206b is smaller by the size of an added mid-plane optical element 208a, 208b. FIG. 5(a) illustrates the beam-splitting ball lens 202 of the present invention having both a beam-splitter filter coating 208 and a filter substrate 208a. The filter substrate 208a is rectangular in shape, thus, to maintain the ball shape of the ball lens, one of the halves 206a is smaller than the other half 204 by the size of the rectangular filter substrate 208a. FIG. 5(b) illustrates a similar embodiment, however, the filter substrate 208b is wedge shaped and the other half 206b is shaped to accommodate the wedge shaped filter substrate 208b. Of course, other shaped mid-plane optical elements are possible.

Figure 6A:
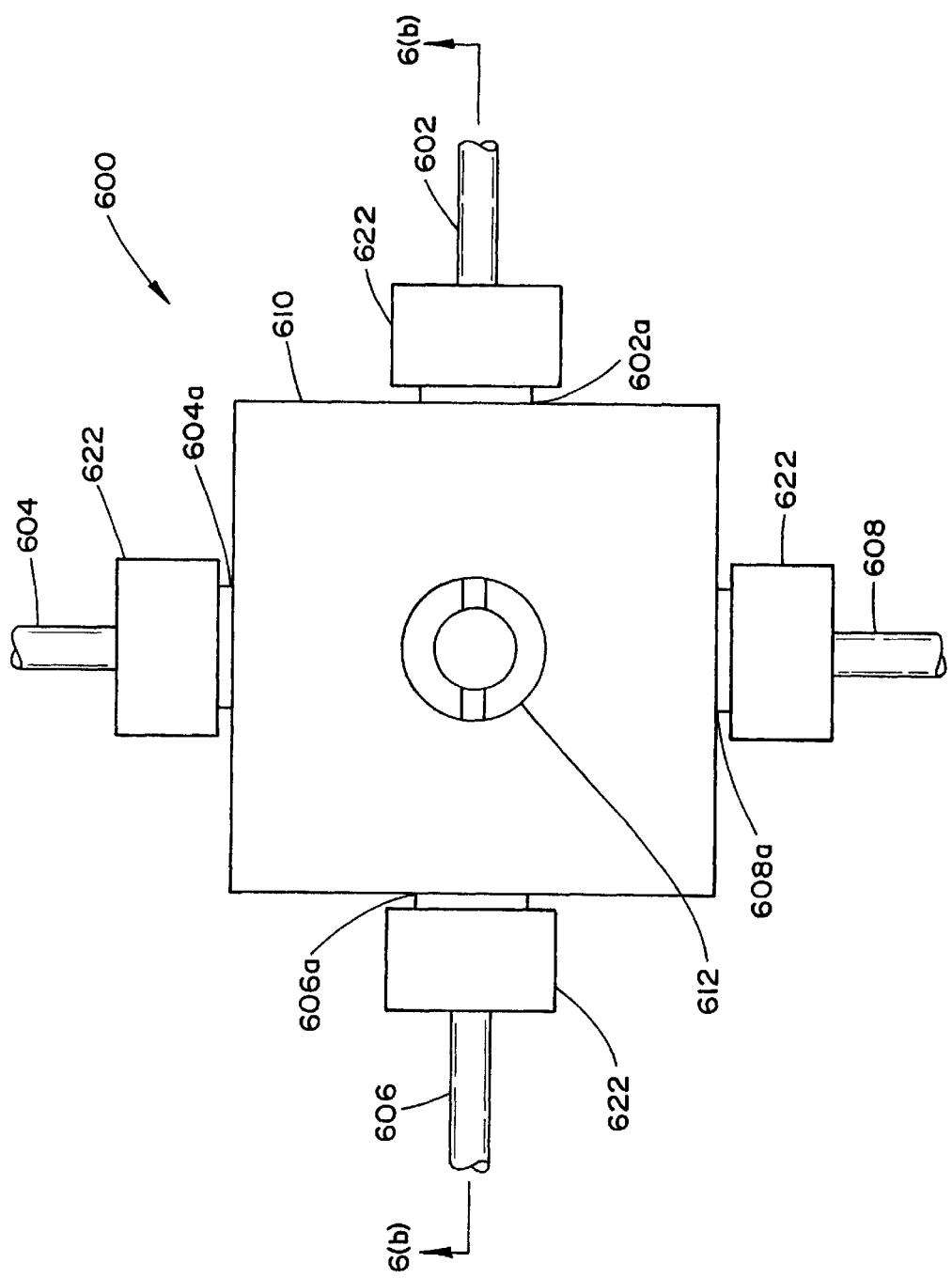
FIG. 6(a) is an isometric view illustrating a mount for packaging fiber image guides and a beam-splitting ball lens of the present invention wherein the mount is configured as a 4-way image splitter/combiner.

Referring now to FIGS. 6(a) and 6(b), to facilitate packaging of the beam-splitting ball lens 202, a mount 600 is provided which helps to couple light between the four input/output optical fiber image guides 602, 604, 606, 608 and a 4 mm diameter beam-splitting ball lens 202. The mount has a body 610, preferably fabricated from aluminum, having a means to retain the beam-splitting ball lens 202 therein. The body further having access holes 602a, 604a, 606a, 608a for the optical fiber image guides 602, 604, 606, 608. The access holes 602a, 604a, 606a, 608a are aligned with the beam-splitter filter 208 such that light inputted to the inputs 602, 608 are directed to corresponding outputs 604, 606.

The body 610 preferably comprises a unitary block having a threaded through hole 611 for housing the beam-splitting ball lens 202 within the mount 600. The beam-splitting ball lens 202 is retained in the threaded through hole 611 by means of a screw plug 612 threadingly engaged on both sides of the threaded through hole 611. Each screw plug 612 has a threaded portion 614 which mates with a corresponding threaded portion 616 of the threaded through hole 611. Each screw plug 612 preferably has a concavity 618 corresponding to the outer surface of the beam-splitting ball lens 202. The vertical positioning of the beam-splitting ball lens 202 along arrow A is accomplished by advancing one of the screw plugs 612 while withdrawing the other an equal amount.

The mount 600 further has means to fix and adjust the optical fiber image guides 602, 604, 606, 608 in the access holes 602a, 604a, 606a, 608a of the body 610. This means preferably comprises a threaded bushing 620 threadingly fixed in each of the access holes 602a, 604a, 606a, 608a and having a bore 620 for passage of a corresponding optical fiber image guide 602, 604, 606, 608. A cap 622 having an internal threaded portion 622a which threadingly mates with a portion of the threaded bushing protruding from the body 610. The cap 622 further has a bore 622b axially aligned with the bore 620a of the threaded bushing 620. Each optical fiber image guide 602, 604, 606, 608 is passed through the bores 622b, 620a of the cap 622 and threaded bushing 620, respectively, and is retained therein by an o-ring 624 which is squeezed around the outer periphery of the optical fiber image guide when the cap 622 is advanced over the threaded bushing 620.

Figures 6C, 6D:
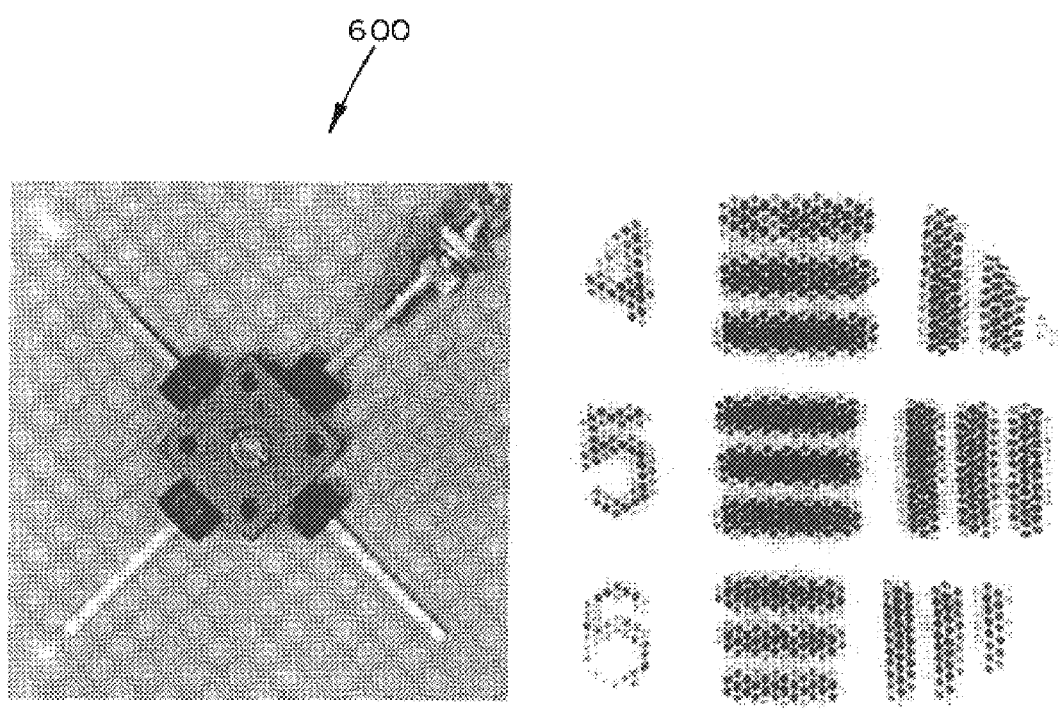
FIG. 6(c) is a photograph of the mount of FIG. 6(a).
FIG. 6(d) illustrates a typical output image of group 3 elements of a target.

FIG. 6(c) shows a photograph of a packaged four-way optical image splitter/combiner (mount) 600 which uses a combination of both guided-wave components, i.e. optical fiber image guides, and a free-space component, i.e. a beam-splitting ball lens 202. The assembly has a 1.5 dB excess and a power splitting ratio of T/R=0.3 dB.

FIG. 6(d) shows a typical image (group 3) of the USAF target at an output port of the packaged four-way image combiner/splitter. Thus, only about 11–12 lp/mm can be resolved, primarily due to a resolution limit of the optical fiber image guides (about 20 lp/mm) and an effect of cascading two optical fiber image guides and a lens. Nevertheless, the resolution is sufficient to resolve a 2D laser pattern with a laser pitched at 125 $\mu$m.

Figure 7:
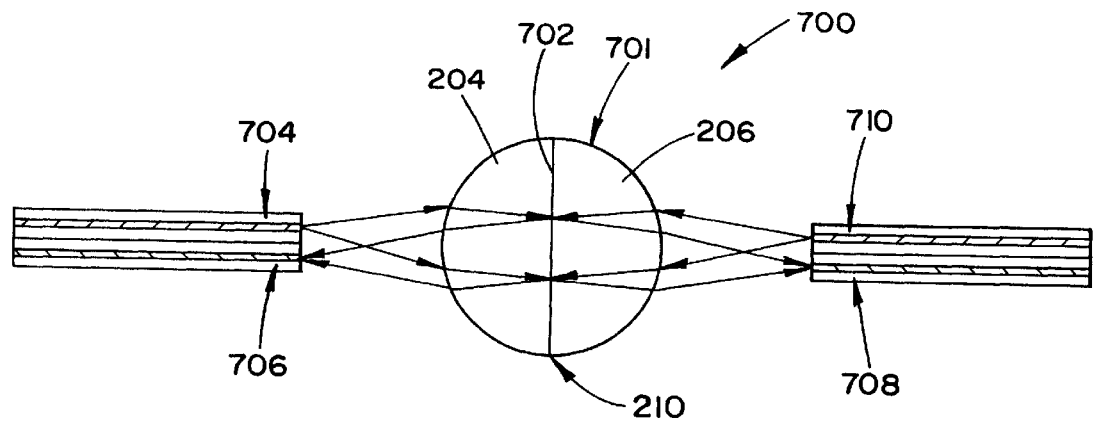
FIG. 7 illustrates a WDM add/drop multiplexer using a variation of the beam-splitting ball lens of the present invention.

Referring now to FIG. 7, there is illustrated a WDM add/drop multiplexer (ADM), referred to generally by reference numeral 700 utilizing a variation of the beam-splitting ball lens 202 of the present invention, designated by reference numeral 701. The ADM ball lens 701 has a wavelength filter 702 disposed at the junction 210 between its two halves 204, 206 instead of the beam-splitting filter 208. The WDM add/drop multiplexer 700 is a 4-port device with a main input port 704, a main output port 706, a drop channel output port 708, and an add channel input port 710. The ports are typically optical fibers. ADM's are useful to download information associated with a particular wavelength channel. The main input port 704 carries all WDM channels of $\lambda_1, \lambda_2, \ldots \lambda_n$, where data for $\lambda_i$ is to be downloaded. The main output port 706 transmits all channels to somewhere else. The wavelength filter 702 at the junction 210 of the ball lens halves 204, 206 has the functionality that only passes through a designated wavelength band, for instance $\lambda_i$. The wavelength filter 702 reflects all other wavelength channels just like a mirror. Thus, when all wavelengths are present at the wavelength filter 702 from the input channel 704, only the $\lambda_i$ wavelength passes through the ball lens and is focused into the drop channel 708. All remaining channels are reflected and are focused into the output channel 706. The missing channel is replaced by a new beam of wavelength $\lambda_i$ sent by the add channel 710. Since the wavelength filter 702 is designed to pass through wavelength $\lambda_i$, this wavelength rejoins the remaining wavelengths at the output port 706 which transmits all wavelengths $\lambda_1, \lambda_2, \ldots \lambda_n$ to a trunk line. Thus, with the ADM ball lens 701 of the present invention, a single integrated optical component serves as both a filter and a fiber-filter interface device.

Figure 8:
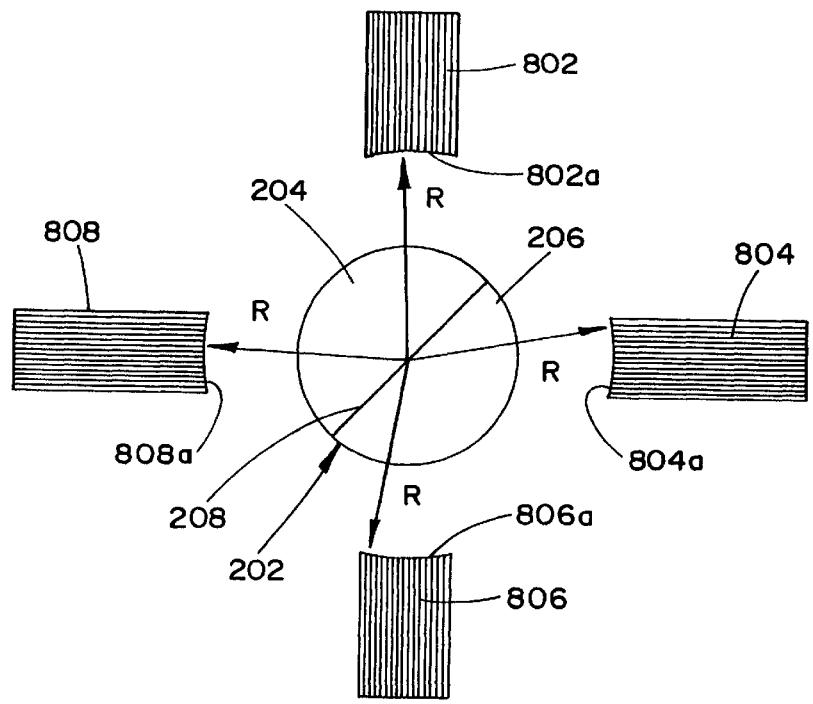
FIG. 8 illustrates the beam-splitting ball lens of the present invention used with image fibers having curved ends to minimize off-axis aberrations.

Referring now to FIG. 8 there is illustrated the beam-splitting ball lens 202 of the present invention packaged with four fiber image guides 802, 804, 804, 808. To minimize off-axis aberrations due to the curved surface of the beam-splitting ball lens 202, the image fibers 802, 804, 804, 808 have curved ends 802a, 804a, 806a, 808a. Preferably, the curved ends 802a, 804a, 806a, 808a each have a radius corresponding to the radius (R) from the center of the beam-splitting ball lens 202.

To summarize, the present invention provides a new integrated optical component, a beam-splitting ball lens which can serve the need for imaging and splitting 2D data patterns for various data communication and sensing applications. Also provided is a compact and flexible packaging system (mount) to allow the use of a beam-splitting ball lens with optical fiber image guides which are cost-effective flexible 2D optical wave-guiding channels. Thus, the beam-splitting ball lens of the present invention and its packaging mount will help ease design concerns of future 2D array based large-bandwidth board- and back-plane-level optical interconnections.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A beam-splitting ball lens comprising:
    a ball lens comprising first and second portions;
    a beam-splitter filter disposed at a junction between the first and second portions of the ball lens, and
    a mid-plane optical element disposed at the junction between the first and second portions;
    wherein one of the first or second portions is substantially half the size of the ball lens and the other of the first and second portions is smaller than half the size of the ball lenses by the size of the mid-plane optical element.

2. The beam-splitting ball lens of claim 1, further comprising an adhesive for adhering the first and second portions and the beam-splitter filter together.

3. The beam-splitting ball lens of claim 1, wherein the first and second portions are substantially the same size and shape and the beam-splitter filter is disposed substantially in the middle of the beam-splitting ball lens.

4. The beam-splitting ball lens of claim 1, wherein the mid-plane optical element is selected from a group consisting of a wavelength selective filter, a polarization component, an amplitude modulation mask, a phase modulation mask, a hologram and/or a grating.

5. The beam-splitting ball lens of claim 1, wherein the mid-plane optical element is rectangular shaped.

6. The beam-splitting ball lens of claim 1, wherein the mid-plane optical element is wedge shaped.

7. The beam-splitting ball lens of claim 1, wherein the ball lens is fabricated from a material selected from a group consisting of glass, crystal, semiconductor, and polymer.

8. A method for fabricating a beam-splitting ball lens, the method comprising the steps of:
    providing a ball lens having first and second portions; and
    disposing a beam-splitter filter at a junction between the first and second portions of the ball lens; and
    disposing a mid-plane optical element at the junction between the first and second portions;
    wherein one of the first or second portions is provided substantially half the size of the ball lens and the other of the first and second portions is provided smaller than half the size of the ball lenses by the size of the mid-plane optical element.

9. The method of claim 8, wherein the disposing step comprises:
    dividing the ball lens into first and second portions; and
    disposing the beam-splitter filter at a junction between the first and second portions.

10. The method of claim 9, further comprising the step of adhering the first and second portions and the mid-plane optical element together with an adhesive.

11. The method of claim 9, wherein the dividing step comprises cutting the ball lens into the first and second portions.

12. The method of claim 8, wherein the disposing step comprises:
    individually molding the ball lens into first and second portions; and
    disposing the beam splitter filter at a junction between the first and second portions.

13. The method of claim 8, wherein the disposing step comprises:
    individually casting the ball lens into first and second portions; and
    disposing the beam splitter filter at a junction between the first and second portions.

14. The method of claim 8, wherein the providing step comprises fabricating the ball lens from a material selected from a group consisting of glass, crystal, semiconductor, and polymer.

15. A mount for a beam-splitting ball lens, the beam-splitting ball lens comprising a ball lens and a beam-splitter filter disposed within the ball lens, the mount comprising a body, the body having a means to retain the beam-splitting ball lens therein, the body further having access holes for two inputs and two outputs corresponding to the two inputs, the access holes being aligned with the beam-splitter filter such that light inputted to the inputs are directed to corresponding outputs, the mount further comprising alignment means for aligning and adjusting the beam-splitting ball lens relative to the inputted light.

16. The mount of claim 15, wherein the alignment means comprises first and second screw plugs, each screw plug being threadingly disposed in a threaded through hole in the body thereby sandwiching the beam-splitting ball lens therebetween such that advancing one of the screw plugs and withdrawing the other of the screw plugs an equal amount positions the beam-splitting ball lens along a vertical axis relative to the inputted light.

17. The mount of claim 15, wherein light is input to and output from the beam-splitting ball lens by optical fiber image guides, the mount further comprising means to fix and adjust the optical fiber image guides in the access holes of the body.

18. The mount of claim 17, wherein the means to fix and adjust the optical fiber image guides in each of the access holes of the body comprises:
    a threaded bushing disposed in a mating threaded portion of each of the access holes, each threaded bushing further having a first bore for passage of a corresponding optical fiber image guide;
    a cap threadingly disposed on a portion of each of the threaded bushings protruding from the body, each cap further having a second bore axially aligned with the first bore for passage of the corresponding optical fiber image guide; and
    an o-ring disposed between each threaded bushing and cap such that when the cap is advanced relative to the threaded bushing the o-ring is squeezed around an outer periphery of the corresponding optical fiber image guide and retained therein.

19. A mount for a beam-splitting ball lens, the beam-splitting ball lens comprising a ball lens and a beam-splitter filter disposed within the ball lens, the mount comprising a body, the body having a means to retain the beam-splitting ball lens therein, the body further having access holes for two inputs and two outputs corresponding to the two inputs, the access holes being aligned with the beam-splitter filter such that light inputted to the inputs are directed to corresponding outputs, wherein light is input to and output from the beam-splitting ball lens by optical fiber image guides, the mount further comprising means to fix and adjust the optical fiber image guides in the access holes of the body.

20. The mount of claim 19, wherein the means to fix and adjust the optical fiber image guides in each of the access holes of the body comprises:

a threaded bushing disposed in a mating threaded portion of each of the access holes, each threaded bushing further having a first bore for passage of a corresponding optical fiber image guide;

a cap threadingly disposed on a portion of each of the threaded bushings protruding from the body, each cap further having a second bore axially aligned with the first bore for passage of the corresponding optical fiber image guide; and an o-ring disposed between each threaded bushing and cap such that when the cap is advanced relative to the threaded bushing the o-ring is squeezed around an outer periphery of the corresponding optical fiber image guide and retained therein.

* * * * *